FIG. 1.

INVENTORS
BERTRAM C. KEMPSON
KENNETH R. BOYDELL
BY
Reynolds & Christensen
ATTORNEYS

Dec. 27, 1966     K. R. BOYDELL ET AL     3,293,932
CLUTCH CONTROL

Filed Dec. 3, 1963                    5 Sheets-Sheet 5

FIG. 7.

INVENTORS
BERTRAM C. KEMPSON
BY KENNETH R. BOYDELL
Reynolds & Christensen
ATTORNEY

United States Patent Office

3,293,932
Patented Dec. 27, 1966

3,293,932
CLUTCH CONTROL
Kenneth R. Boydell, Bredons Hardwicke, near Tewkesbury, and Bertram C. Kempson, Cheltenham, England, assignors to Dowty Hydraulic Units Limited, Ashchurch, near Tewkesbury, County of Gloucester, England, a British company
Filed Dec. 3, 1963, Ser. No. 327,792
Claims priority, application Great Britain, Dec. 6, 1962, 46,109/62
6 Claims. (Cl. 74—339)

This invention relates to clutch control and is concerned with controlling the engagement of a clutch, particularly a friction clutch, for completing a power transmission circuit from a power source to a load, i.e. controlling the engagement of a clutch which immediately on engagement might transmit the maximum torque of which it is capable.

The object of this invention is to reduce shock loading both for the clutch and for the power transmission associated with the clutch. A further object of the invention is to reduce heat generation in the clutch during engagement.

In accordance with the present invention apparatus for controlling engagement of a clutch in a transmission between driving and driven shafts comprises a speed difference means capable of responding to speed difference between the driving and driven shafts so as to cause engagement of the clutch when the speed difference between the shafts becomes small.

The speed difference means may comprise a pair of small fixed displacement pumps driven by the driving and driven shafts whose liquid deliveries are passed through restrictors and the pressure drops at the restrictors applied in opposition to a piston or the like controlling clutch engagement, the arrangement being such that when the pressure drops reach predetermined relative values at which the speeds of the driving and driven shafts are equal the piston or the like moves to cause clutch engagement.

Alternatively, the speed difference means may comprise a differential gear to which the motion of one shaft is fed directly and to which the motion of the other shaft is fed through a reversing gear, the planet carrier of the differential gear being arranged to cause engagement of the clutch when the planet carrier stops moving, i.e., when the speeds of the driving and driven shafts are equal. The planet carrier may be connected through a friction coupling to a clutch engaging mechanism which causes clutch engagement when the frictional drag exerted through the coupling reverses just after the shafts acquire equal speeds.

Alternatively, the speed difference means may comprise two sets of centrifugal fly-weights driven one set by each shaft, the centrifugal forces or movements resulting from such forces being opposed one to the other to cause clutch engagement when an equilibrium position is attained as the two shafts acquire equal speeds.

Alternatively, the speed difference means may comprise two electrical means associated one with each shaft each of which is adapted to generate an electrical signal proportional to the speed of its shaft, such signals being compared one with the other and arranged to cause engagement of the friction clutch when the signals become equal. Such signals may be formed by voltages, currents or frequencies.

Where the clutch is associated with a mechanical gear box having a plurality of selectable gear ratios, the speed difference means may be associated with the driving or the driven shaft through the intermediary of the gear box, compensating means being introduced to correct for the speed ratio of the gear box. Where the speed difference means comprises a pair of fixed displacement pumps driven by the driving and driven shafts the compensating means may comprise means to vary at least one of the restrictors through which pump deliveries are passed so that when the driving and driven shafts of the gear box acquire a predetermined speed ratio in accordance with the selected speed ratio of the gear box, the pressure drops at the restrictors acquire the predetermined relative values at which clutch engagement occurs. At this point the driving and driven shafts of the clutch will, by virtue of the gears in the gear box, have acquired equal speeds.

Where the speed difference means comprises a differential gear the compensating means may comprise selectable gearing of inverse gear ratios to the gear ratios of the gear box.

Where the speed difference means comprises centrifugal fly-weights the compensating means may comprise adjustable spring-loadings for the fly-weights.

Where the speed difference means comprises electrical means, the compensating means may be electrical in character to divide or multiply the signals in accordance with the selected speed ratios through the gear box. For example, where the signal is a current it may be passed through a selectable number of turns of a solenoid which controls clutch engagement.

The invention further comprises a hydrostatic power transmission and a step-change mechanical gear box arranged in series for the transmission of power from a power source to a load, a clutch associated with the gear box through which power passes from the hydrostatic transmission to the load, a speed ratio control for the transmission, a gear selecting control for the gear box connected for overriding adjustment of the transmission speed ratio during gear change to cause either increase or decrease in transmission speed ratio in accordance with decrease or increase respectively in gear box speed ratio, and also connected to cause clutch disengagement during gear change, and speed difference means operative during gear change to respond to the speeds of the driving and driven shafts of the clutch to cause clutch engagement as their speeds become equal and to terminate overriding control of the transmission speed ratio by the gear selecting control.

The transmission speed ratio may be under the control of a speed governor which responds to power-source speed and adjusts transmission speed ratio in the sense to tend to keep power-source speed constant.

Five embodiments of the invention will now be described with reference to the accompanying drawings, in which, FIGURES 2 and 3 are plan and elevation of the modified speed difference means including a differential gear for use in FIGURE 1, FIGURES 4 and 5 are plan and elevation of another modified speed difference means, including a differential gear for use in FIGURE 1.

Figure 1:
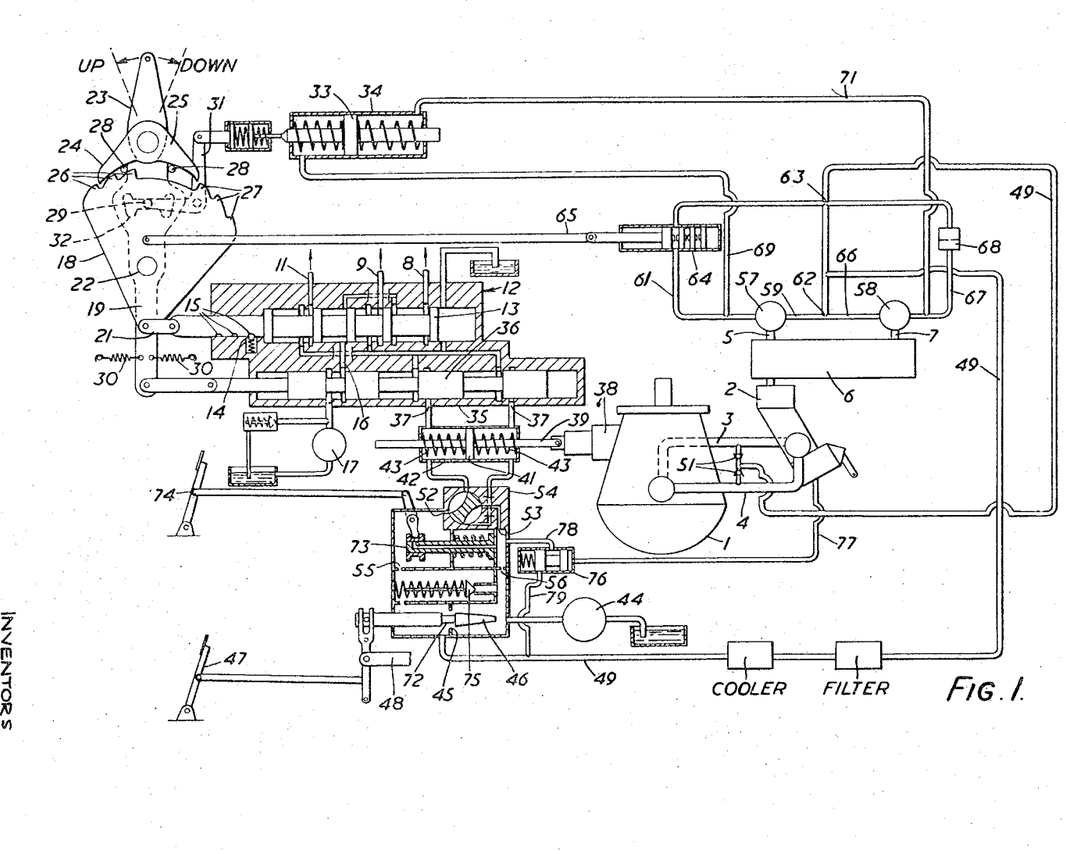
FIGURE 1 is a schematic diagram of one embodiment of the invention incorporated in a complete transmission, including hydrostatic transmission and gear box.

Reference is made initially to FIGURE 1 of the drawings. This embodiment of the invention is applied to the transmission of power in a tractor from the engine to the ground-engaging wheels or the like.

In FIGURE 1 a hydrostatic transmission is formed by a variable positive displacement pump 1 driven by the engine (not shown), a positive displacement hydraulic motor 2 and pipe lines 3 and 4 interconnecting the pump and the motor. The hydraulic motor 2 drives a shaft 5 entering into a mechanical step-change gear box 6. The output shaft 7 from the mechanical step-change gear box is connected to drive wheels or like ground-engaging elements of the tractor.

The gear box is provided with three fixed speed ratios which are engageable independently by supplying hydraulic pressure to any of three pipe lines 8, 9 or 11. In the drawing these pipe lines are shown extending from a control valve 12. The spool valve member 13 within the valve 12 is locatable in any of three fixed positions by means of a spring-loaded ball 14 and three recesses 15. According to the position of the valve member 13 any one of the pipe lines 8, 9 or 11 is supplied with hydraulic pressure through a passage 16 from a gear pump 17 which is driven by the engine. Valve 12 also connects to drain any of the pipe lines 8, 9 or 11 which are not pressurised.

For adjustment of the spool valve 13 a pivoted plate 18 is provided of which extension 19 and link 21 make connection to the valve member 13. Plate member 18 is pivotally mounted about a spindle 22. Also on the spindle 22 is a gear-selecting lever 23 movable to limiting positions indicated in dotted lines at the words "Up" and "Down."

Mounted on the lever 23 are a pair of spring-loaded integrally formed pivoted pawls 24 and 25. The pawl 24 co-operates with three ratchet teeth 26 on plate 18 whilst the pawl 25 co-operates with three ratchet teeth 27 on plate 18. A pair of fixed abutments 28 co-operate with pawls 24 and 25 so that either of these pawls is able only to engage co-operating teeth 26 or 27 on movement of lever 23 from the central position. Lever 23 may be latched in either of its extreme positions by means of a pawl 29 carried by a bell crank lever 31 and engaging within a slot 32 in lever 23. Lever 23 is loaded by springs 30 so as to tend to return to its central position. Lever 31 may be moved in the release sense to permit lever 23 to return to the central position by a hydraulic pressure difference applied to a piston 33 slidably mounted within cylinder 34. A valve 35 having spool valve member 36 is connected for movement by lever 23, the spool valve member 36 occupying any of three positions corresponding to the central and the two extreme positions of lever 23. As illustrated in the central position of the lever 23, the spool valve 36 permits liquid flow from gear pump 17 to passage 16 to engage a gear within the gear box. Also as shown, spool valve 36 closes a pair of ports 37.

For adjustment of the displacement of the pump 1 a servo-motor 38 is provided extending into the pump, this servo-motor being operated by a rod 39. The rod 39 in turn is operated by a piston 41 slidably mounted within cylinder 42. Springs 43 within the cylinder 42 operate to centre piston 41 in the absence of pressure difference across the piston. The central position of piston 41 represents zero displacement of the pump 1, movement to the left as shown in the drawing giving forward displacement to the pump and movement to the right giving reverse displacement to the pump.

For the purpose of controlling displacement of the pump 1 an engine driven gear pump 44 is arranged to deliver liquid at a rate proportional to engine speed through an orifice 45. Within the orifice 45 a tapered needle 46 is located, which is adjustable in position by an engine speed control lever 47 which is connected also by means of the link 48 to the engine speed governor. Liquid delivered by gear pump 44 will enter the pipe 49 after leaving the orifice 45. From the pipe 49 the liquid is delivered through a pair of non-return valves 51 into the transmission pipe line 3 or 4 at lower pressure. By suitably selecting the taper on needle 46 a substantially constant pressure drop may be obtained when the engine is running at the speed determined by the engine fuel governor for any setting of the lever 47. The pressure drop across the orifice 45 is fed by way of restrictors 55 and 56, connections 52 and 53 and reversing valve 54 to the ends of the cylinder 42. For forward displacement from the pump 1 the pressure difference between the ends of the cylinder 42 is such as to urge the piston 41 to the left, as seen in the drawings. The arrangement of the lever 47 to act jointly on the engine fuel governor and on the orifice 45 to control displacement of the pump is described more fully in our co-pending application No. 279,849, now U.S. Patent No. 3,167,907.

For the purpose of adjusting the speed of the motor output shaft 5 so that engagement of any gear in the gear box 6 may be effected without shock through the transmission there is provided a pair of gear pumps 58 and 57 driven respectively by the motor output shaft 5 and the gear box output shaft 7. These pumps may be driven either both forwardly or both in reverse, depending upon whether forward or reverse displacement is selected for the transmission pump 1. Pump 57 is associated with the liquid flow circuit comprising pipes 59, 61 and the part of the pipe 49 between connectors 62 and 63. In the pipe 61 an adjustable orifice device 64 is located which is adjustable to any of three predetermined positions by means of a link 65 extending back to the plate 18. Associated with the pump 58 is a liquid circuit comprising pipes 66 and 67 and a portion of pipe 49 between connectors 62 and 63. In pipe 67 a fixed orifice 68 is located. Pipes 69 and 71 extend from the restrictors 64 and 68 to the two ends of the cylinder 34. Pipes 69 and 71 extend from the sides of their respective restrictors opposite to the connectors 63. The arrangement is such that the pressure drops occurring at the restrictors 64 and 68 are opposed to one another and the difference between these pressure drops only is applied to the piston 33. Because of the fact that the gear pumps 57 and 58 are reversible it will be clear that liquid will flow in either direction around the circuits associated with these pumps and, accordingly, that the pressure drops occurring at the restrictors 64 and 68 will vary in direction according to the direction of flow of liquid through them. By virtue of the fact that the two liquid circuits are connected to the pipe 49 carrying low-pressure liquid for the transmission, both liquid circuits associated with the pump 57 and 58 are continuously pressurised. Provided that the maximum pressure drops occurring at the restrictors 64 and 68 are lower than the pressure in pipe 49, the difference in the pressure drops at the restrictors can always be applied to the piston 33.

When the vehicle having the transmission described is at rest with the engine idling, the lever 47 will be located in a position selecting idling speed on the engine governor and at this position a notch 72 on the tapered pin 46 coincides with the orifice 45. This renders the orifice 45 effectively of very large size so that little or no pressure drop is produced across it by flow of oil from the pump 44. This will cause the piston 41 to be held in its central position by its springs 43 so that pump 1 is at zero displacement. Accordingly, the motor output shaft 5 will not rotate and the vehicle will not move. Assume that the valve 12 is in the position indicated in the drawing in which first gear is selected by the supply of oil from the gear pump 17 through the pipe 8. The vehicle may be accelerated from rest by moving lever 47 to increase engine speed and to move the tapered pin 46 into the orifice 45 to give a pressure drop at this orifice which causes displacement of piston 41 to the left for forward displacement. Pump 1 then supplies liquid to motor 2 which drives the ground-wheels through the gear box 6. Assume now that the driver wishes to change from first gear to second gear within gear box 6. The driver will push lever 23 to the "Up" position, this movement causing the pawl 24 to engage a tooth 26 to rotate the plate 18 by a predetermined amount. This movement will cause movement of the spool valve 13 which will connect pipe 8 to drain and passage 16 to pipe 9. The pipe 9 leads to the clutch within the gear box 6 for engagement of the second gear. Movement of the lever 23 to the "Up" position will also cause movement of spool valve 36 to the right which will isolate pump 17 from passage 16, thus preventing the application of pressure to pipe 9. Movement of the valve 36 will also open the ports 37 connecting both these ports to low pressure. Liquid will flow through the restrictors 55 and 56 to the ports 37 thus reducing pressure at the two ends of the cylinder 42 to a low value, even though the engine is running at its governed speed. The pressure difference acting on the piston 41 is therefore removed and the springs 43 will move piston 41 to the centre to reduce the selected displacement of the pump and thus the speed of rotation of the motor shaft 5. Movement of the lever 23 to the "Up" position will have permitted the pawl 29 to engage the end of slot 32 to lock the lever 23 in the "Up" position. At the instant of putting lever 23 forward, the restrictor 64 will be adjusted to a smaller size by movement of the rod 65. Instantly the pressure drop at the restrictor 64 will rise giving a pressure difference acting on the piston 33 to hold pawl 29 in the end of slot 32. As displacement of pump 1 reduces, speed of the motor output shaft 5 and the gear pump 57 will reduce, thereby reducing the pressure drop at the restrictor 64. The adjusted size of restrictor 64 is such that the pressure drops at restrictors 64 and 68 can only be equal when the speeds of pumps 57 and 58 are in the same ratio as the speed ratio through the gear box 6 of the second gear which is about to be engaged. Thus, when motor shaft 5 loses speed sufficiently so that pressures on either side of piston 33 are equal, springs in the cylinder 34 will centralise piston 33 to move pawl 29 to release it from the end of slot 32, so that the springs 30 may move lever 23 to the central position. Movement of lever 23 to the central position will move the spool valve member 36 to feed pressure to the passage 16 from pump 17 and thus into pipe 9 to engage the second gear clutch within the gear box 6. Such movement will also close the ports 37 so that pressure difference between the ends of the cylinder 42 can build up as a result of the flow through the orifice 45 of the delivery from pump 44.

At the instant that the second gear clutch in the gear box 6 is engaged the motor shaft 5 is rotating at an appropriate speed so that the two clutch members of the second gear clutch are rotating at equal speeds. A differing load will now be imposed on the engine and the engine speed and the displacement of the pump 1 will settle to values at which the engine is fully loaded.

It will be seen that the delivery from the gear pump 44 through the orifice 45 and the feeding of the pressure drop occurring at the orifice 45 to the piston 41 will form a governor which responds to the speed of the transmission pump 1 and of the engine (since pump 44 is engine-driven) and will form a governor which will tend to govern the speed both of the pump 1 and of the engine by the variation of the displacement of pump 1 in accordance with the alteration in the pressure drop at the orifice 45. For example, if the engine and the pump 1 tend to lose speed the pressure drop at the orifice 45 will reduce and springs 43 will move piston 41 nearer to the centre position, thus reducing the displacement of the pump 1 and the load applied to the engine. Thus it will be seen that the effect of the governor formed by the pump 44, orifice 45 and cylinder 42 is to tend to maintain engine and pump speed constant by varying the displacement of the transmission pump 1.

Variation of the displacement of the transmission pump 1 acts to vary the speed ratio of the hydrostatic transmission formed by the pump 1 and the motor 2. In the present example the displacement of the motor 2 is fixed, but it will be appreciated that the displacement of the motor 2 could also be variable in order to adjust the speed ratio of the hydrostatic transmission.

If, following further increase in vehicle speed, the driver wishes to select third gear, lever 23 is pushed again to the "Up" position and the sequence of operation as previously described will be repeated with the exception that hydraulic pressure will eventually be fed to the pipe 11 for engagement of the third gear clutch.

In the event that the driver wishes to reduce from a higher gear to a lower gear, for example from second gear to first gear, the lever 23 is pulled to the "Down" position, pawl 25 engaging a tooth 27 to move plate 18 in a clockwise sense seen in the drawing. Pawl 29 will engage in the slot 32 to retain the lever in the "Down" position resulting from the fact that orifice 64 is altered by movement of the plate 18, altering the pressure drop at the orifice 64 and thereby creating a pressure difference across the piston 33. Movement of the plate 18 will also cause movement of spool valve member 13 to connect passage 16 to pipe 8. The pressure supplied to the passage 16 however is cut off by the movement of the spool valve 36. Movement of the spool valve 36 is to the left as seen in the drawing and it is arranged that such movement will not uncover the ports 37. The fact that no clutch in the gear box 6 is then engaged means that no load can be exerted on the engine and therefore that its speed will rise within the range permitted by the engine fuel governor. This in turn will cause increase in delivery of the pump 44 without corresponding alteration of the needle 46 so that the increased delivery through the orifice 45 will give an increased pressure drop which is fed to the cylinder 42, to move piston 41 in the direction to increase the displacement of pump 1. This increase in displacement will increase the speed of the motor shaft 5. When the speed of the motor output shaft 5 has reached a value to produce a pressure drop at restrictor 64 which equals the pressure drop at restrictor 68 the shaft 5 will be synchronised so that the first gear clutch within the gear box 6 may be engaged without creating shock in the transmission. The equalisation of the pressure drops at restrictors 64 and 68 releases the pawl 29 permitting lever 23 to be moved to the central position by the spring 30, whereby the valve 36 moves to connect passage 16 to pipe 8 to cause engagement of the first gear clutch.

In order to drive the vehicle in the reverse direction the valve 54 is moved to reverse the connections of passages 52 and 53 to the ends of cylinder 42. This will give reverse displacement to the pump 1 to cause reverse movement of the motor shaft 5. The operation of selecting gears in the gear box by engaging clutches is then exactly as described previously for selecting gears in the forward direction. The only real difference in operation lies in the fact that the pumps 57 and 58 are now driven in the reverse direction and produce pressure drops in the opposite sense across the restrictors 64 and 68. However, since the pressure drops are opposed to one another and are both less than the transmission make-up pressure supplied through the pipe 49, operation of the piston 33 and the pawl 29 remains the same.

If substantial braking of the vehicle is required a valve 73 may be provided operable by a brake pedal 74. Valve 73, when opened, connects together the connections 52 and 53 to remove the pressure difference across the ends of the piston 42 so that the spring 43 adjust the displacement of pump 1 towards zero. This reduces the speed ratio of the hydrostatic transmission and thus brakes the vehicle.

A relief valve 75 is provided in parallel with the orifice 45. The spring loading of this valve is such that it will prevent pressures being generated at the orifice 45 greater than are necessary to give full displacement to the piston 41 in one direction or the other.

In order to prevent excessive transmission pressures being developed between the pump 1 and the motor 2, spring-loaded valve 76 is connected through pipe 77 to a shuttle valve (not shown) responding to transmission pressures. The spring-loaded valve 76 opens when excessive transmission pressure occurs to complete a liquid flow passage through pipes 78 and 79 to form a parallel circuit across the orifice 45 and thus to reduce the pressure drop developed at the orifice 45. In turn this will cause reduction of pump dispacement to relieve the excessive transmission pressure.

Figure 2:
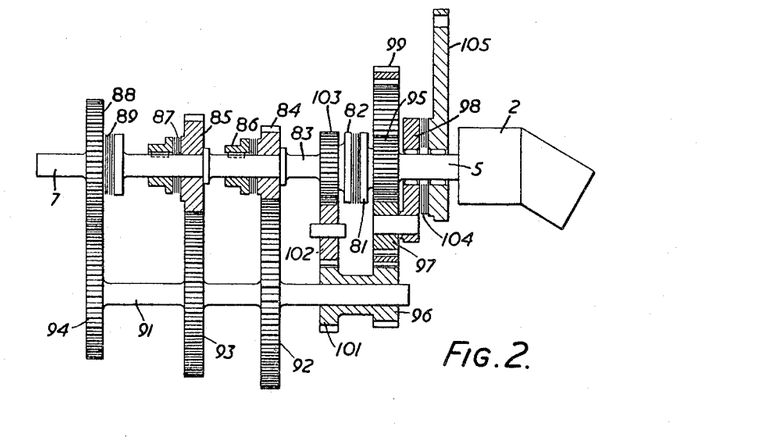
Figures 3, 5:
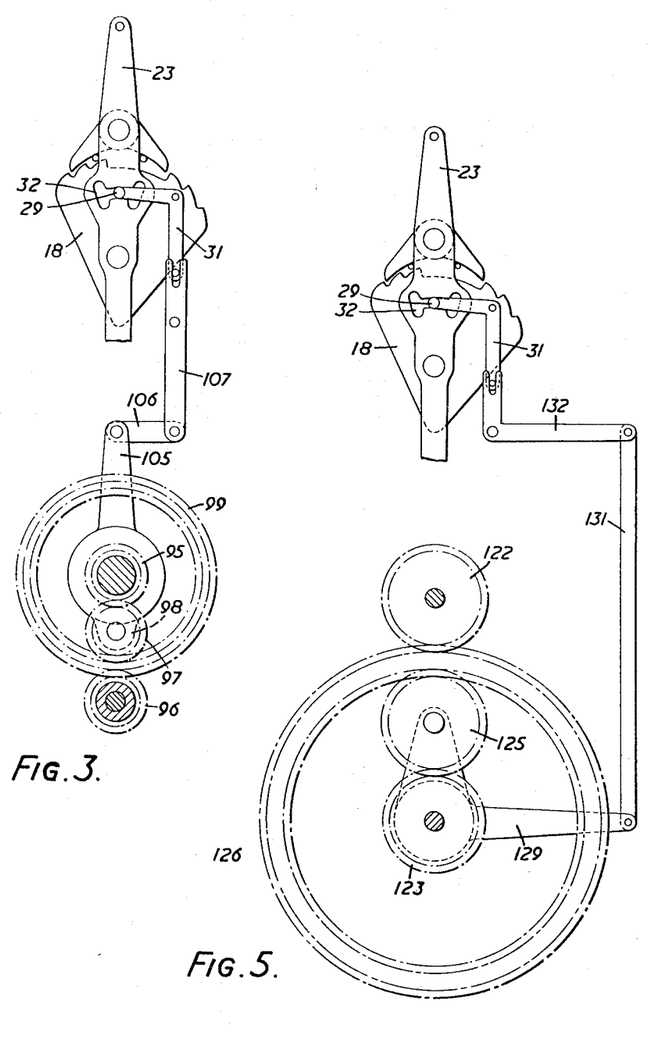

Reference is now made to FIGURES 2 and 3 of the accompanying drawings. In FIGURE 2 the hydraulic motor of the transmission drives through its output shaft 5 one member 81 of a main clutch. The other member 82 of the main clutch drives a shaft 83 on which are loosely mounted a pair of gears 84 and 85 of differing sizes. The gear 84 may be clutched to shaft 83 by a clutch 86 whilst the gear 85 may be clutched to the shaft 83 by the clutch 87. The output shaft 7 from the gear box carries a gear 88 secured thereto. A clutch 89 is provided capable of connecting the shaft 83 to the shaft 7. Within the gear box a lay-shaft 91 is located for rotation parallel to the shaft 83, and includes three gears 92, 93, and 94 which mesh respectively with the gears 84, 85 and 88.

If clutch 86 is engaged power may be transmitted through shaft 83, gear 92, gear 94 and gear 88 to shaft 7. This corresponds to first gear. If clutch 87 is engaged power is transmitted from shaft 83 through gears 85, 93, 94 and 88 to the shaft 7. This corresponds to second gear. If clutch 89 is engaged power is transmitted directly from shaft 83 to shaft 7. This is third gear.

The speed difference means comprises a differential gear formed by a first gear 95 fixedly mounted on the shaft 5, a second gear 96 loosely mounted on the shaft 91, a planet gear 97 carried by a carrier 98 loosely mounted on the shaft 5 and a cage gear 99 having both internal and external teeth and arranged to convey motion from gear 96 to plant gear 97. The second gear 96 is integrally formed with a driving gear 101 which is driven through a reversing gear 102 from a gear 103 fixedly mounted on the shaft 83. The function of the gears 103, 102 and 101 is to transmit the rotation of the clutch member 82 with reversal to the second gear 96. The arrangement is such that if the main clutch members 81 and 82 are engaged rotation of the shaft 5 and corresponding rotation of the engaged gears will result in the planet carrier 98 remaining stationary.

A light friction clutch 104 interconnects the carrier 98 with a lever 105. The lever 105 is connected by link 106 and lever 107 to the bell crank lever 31 of FIGURE 1 in substitution for the piston and cylinder unit 33, 34.

In using the embodiment of FIGURES 2 and 3 to modify FIGURE 1, the gear clutches 86, 87 and 89 are directly engaged by the position of the pivoted plate 18 whilst the main clutch, 81, 82 is arranged to be engaged when lever 23 is in its central position but disengaged for movement of this lever into either of the "Up" or "Down" positions. When a new gear is selected by movement of the lever 23 to the "Up" or the "Down" position main clutch 81, 82 will be disengaged whilst the appropriate gear clutch 86 or 87 or 89 will be engaged. As described with reference to FIGURE 1 the motor speed will alter, following selection of a new gear, in the appropriate sense to tend to synchronise the two main clutch members 81, 82. Whilst the main clutch members remain out of synchronism planet carrier 98 will rotate in one direction or the other applying a continuous drag through clutch 104 to the lever 105 to cause pawl 29 to engage one end of the slot and to prevent centralisation of lever 23. When the clutch members 81, 82 become synchronised, carrier 98 will cease rotating. The frictional drag of clutch 104 will reverse as the clutch members pass through the synchronised condition. The pawl 29 will then move allowing lever 23 to move to the central position and causing engagement of the main clutch 81, 82. Such engagement is thus carried out when the clutch members are synchronised thus minimising shock to the whole transmission.

Figure 4:
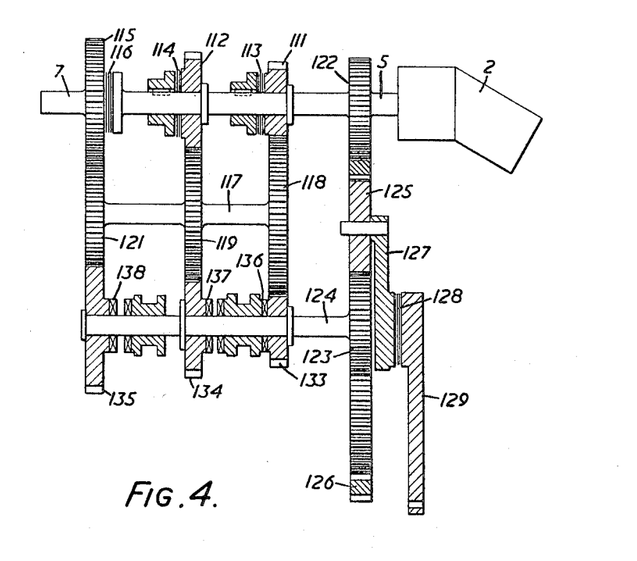

Reference is now made to the embodiment of the invention shown in FIGURES 4 and 5 of the accompanying drawings. The gear box arrangement illustrated may be used as a modification in the embodiment of FIGURE 1. The transmission motor 2 drives the shaft 5 which extends into the gear box having loosely mounted upon it a pair of gears 111 and 112. Either of the gears 111 and 112 may be clutched to the shaft 5 by means of clutches respectively 113 and 114. The output shaft 7 from the gear box carries within the gear box a gear 115 fixedly secured thereto. A clutch 116 is positioned for connecting the shaft 5 directly to the shaft 7. Within the gear box a lay shaft 117 has three gears 118, 119 and 121 fixedly secured thereto and meshing respectively with the gears 111, 112 and 115. For the first gear the clutch 113 is engaged and power is transmitted through the gears 111, 118, 121 and 115 to the output shaft 7. For the second gear the clutch 114 is engaged and power is transmitted from shaft 5 through gears 112, 119, 121 and 115 to the shaft 7. For the third gear the clutch 116 is engaged and power is transmitted directly from the shaft 5 to the shaft 7. In this embodiment no main clutch is provided and any of the three gear ratios may be engaged by engaging the corresponding clutch 113, 114 or 116. The speed difference means comprises a differential gear having a first gear 122 fixedly mounted on the shaft 5, a second gear 123 fixedly mounted on an auxiliary shaft 124, a planet gear 125 directly meshing with the second gear 123 and indirectly meshing through the medium of an internally and externally tooth caged gear 126 with the gear 122. The planet gear 125 is rotatably mounted on carrier 127 whose rotation axis is co-axial with the shaft 124. A light friction clutch 128 connects the carrier 127 with a lever 129. The lever 129 is connected through a link 131 and lever 132 to the bell crank lever 31.

Within the gear box the auxiliary shaft 124 lies parallel to the shafts 5 and 117 and includes three gears 133, 134 and 135 loosely mounted thereon and in mesh respectively with the gears 118, 119 and 121.

Dog clutches 136, 137 and 138 are provided for connecting the gears respectively 133, 134 and 135 to the shaft 124. The dog clutches 136, 137 and 138 are engaged in accordance with the position taken up by the plate 18. The engagement of the gear clutches 113, 114 and 116 may be effected hydraulically by the valve arrangement of FIGURE 1, these clutches being engaged alternatively by pressure fed to the pipes 8, 9 and 11.

In this embodiment on selection of a new mechanical gear, the lever 23 is moved appropriately to the "Up" or the "Down" position, the lever then being retained by the pawl 29. The resulting movement of the plate 18 will engage the appropriate dog clutch 136, 137 or 138 and will prepare a hydraulic circuit for connecting hydraulic pressure to the appropriate gear clutch 113, 114 and 116. As described wth reference to FIGURE 1 the speed of the motor will alter towards a synchronising speed. The arrangement of the auxiliary gears 133, 134 and 135 is such that gear 133 is the same size as the gear 111, gear 134 is the same size as the gear 112 and gear 135 is the same size as gear 115. Thus, by engagement of, for example, the first gear clutch 113 and the first gear dog clutch 136, the auxiliary shaft 124 would rotate at the same speed as the shaft 5. Engagement of the gear clutch 114 and the dog clutch 137 would also cause shaft 124 to rotate at the same speed as shaft 5. Again, engagement of the clutch 116 and of dog clutch 138 would also cause shaft 134 to rotate at the same speed as the shaft 5. On selection of a new gear the plate 18 will engage the dog clutch appropriate to the new gear and the shaft 124 will rotate at the speed of the appropriate gear 111 or 112 or 115 which is to be clutched to the motor shaft 5. Since such gear is in connection with the output shaft 7, the auxiliary shaft 124 will then rotate at a different speed from the shaft 5 which will cause rotation of the planet carrier 127 which will exert frictional drag through clutch 128 on the pawl 29 to retain lever 23 in the "Up" or the "Down" position. As described with reference to FIGURE 1 the hydraulic motor 2 will alter its speed and the two members of the selected clutch 113 or 114 or 116 to be engaged will alter their relative speeds. As the two members of the particular clutch approach synchronism the carrier 127 will rotate more slowly and at synchronism will stop rotation completely. At this point the frictional drag will reverse and the pawl 29 will release lever 23 permitting it to move back to the central position, at which point hydraulic pressure is supplied to the appropriate gear cluch to engage it thus connecting power from the engine to the ground-engaging wheels at the new gear ratio.

Figure 6:
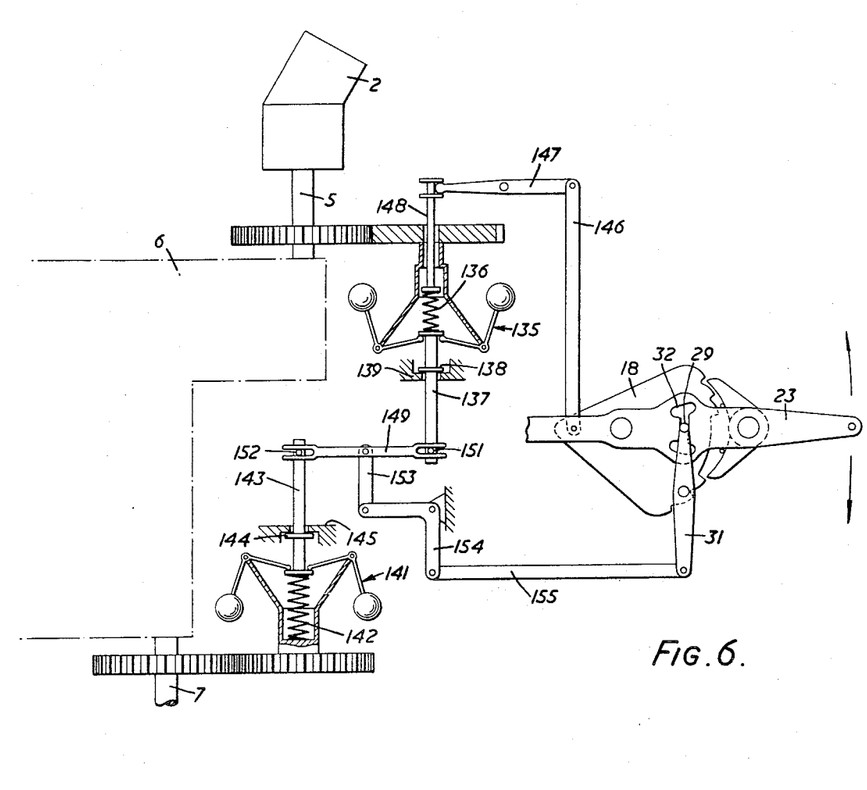
FIGURE 6 is a schematic diagram of the modified speed difference means incorporating fly-weights for use in FIGURE 1, and, FIGURE 7 is a schematic diagram of a modified speed difference means electrically operated for use in FIGURE 1.

Reference is now made to the embodiment of the invention illustrated in FIGURE 6. This embodiment is intended for substitution in FIGURE 1 by the replacement of the pumps 5 and 7 and the restrictors 68 and 64. The hydraulic motor 2, as in FIGURE 1, drives the shaft 5 entering the gear box 6 and the output shaft 7 from the gear box drives the ground-engaging wheels. Externally of the gear box 6 a fly-weight assembly 135 is driven in synchronism with the shaft 5, the fly-weights being loaded by an axial spring 136. The spring 136 presses against a shaft 137 to hold a flange 138 in contact with the stop 139. The output shaft 7 from the gear box drives a fly-weight assembly 141 which is loaded by a spring 142. The spring 142 presses on an axial shaft 143 having a flange 144 which engages a stop 145. The loading of the spring 136 is adjustable through link 146, lever 147 and rod 148 in the sense that lower selected gear box ratios will increase the loading of the spring 136. The two shafts 137 and 143 are interconnected by a floating lever 149 having pin-and-socket connections 151 and 152 respectively with the shafts. Centrally of lever 149 a link 153 is loosely secured, being connected at its opposite end to a bell crank lever 154. From the bell crank lever 154 a link 155 extends to the lever 31 which carries the pawl 29 acting on lever 23. When the transmission, including the modification of FIGURE 6 is not in operation, the springs 136 and 142 will urge their shafts so that the flange is engaged on the stops and the floating lever 149 takes the position indicated.

In operation the fly-weight assemblies are rotated at speeds proportional to the speeds of the shafts 5 and 7. When a gear is engaged within the gear box the ratio of speeds of the fly-weights assemblies will be fixed and it is arranged that the loading applied to the spring 136 by the plate 18 when a gear is engaged is such that the movements of the shafts 137 and 143 under centrifugal action, are approximately equal, whereby the linear movement of the centre of the floating lever 149 from the rest position illustrated in the drawing is substantially zero. On selecting a new gear the lever 23 will be moved in the appropriate direction, the initial movement causing movement of the plate 18 which will adjust the loading of spring 136. The lever will be retained by the pawl in either the "Up" or the "Down" position and, as described with reference to FIGURE 1, the motor 2 will adjust its speed to tend to synchronise with the speeds of the output shaft 7 as modified by the speed ratio of the gear to be engaged. The fact that the fly-weight assemblies are not rotated at synchronised speeds will mean that the shaft 137 of fly-weight assembly 135 will be deflected either a greater or a lesser amount than the deflection of the shaft 143 with a result that the centre of the floating lever 149 is displaced from its rest position. Such displacement will hold pawl 29 displaced to retain lever 23 in the "Up" or the "Down" position. When the motor shaft 5 reaches a synchronised speed with reference to the shaft 7 the displacements of the shafts 143 and 137 will be approximately equal and the centre of the floating lever will approach the rest position so that the pawl 29 can no longer retain the lever in the "Up" or the "Down" position. The lever will then centralise itself following spring action causing engagement of the clutch within the gear box. Such clutch engagement will then occur when the clutch members are rotating at similar speeds.

Figure 7:
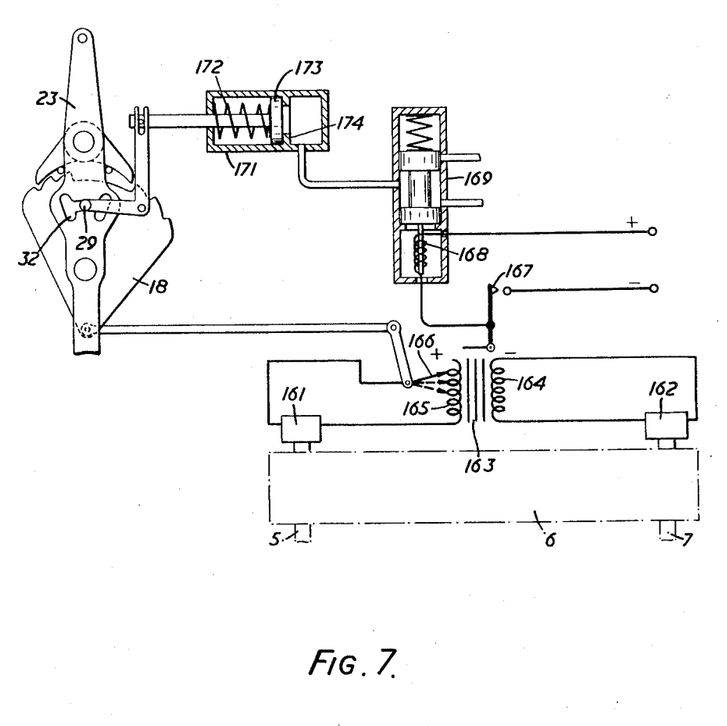

Reference is now made to FIGURE 7. In this embodiment the motor shaft 5 and the output shaft 7 from the gear box 6 are connected to drive electrical generators respectively 161 and 162. These generators are of the kind in which the voltage output is proportional to the driving speed. A double wound relay 163 is provided having a first winding 164 and a second winding 165. The winding 165 includes three tapping positions selectable by a switch 166. The generator 162 is connected to the winding 164 and the generator 161 is connected to the portion of the winding 165 selected by switch 166. The direction of current flowing through the two windings is such that the resultant effects oppose one another. The armature of the relay 163 carries a contact 167 which completes a circuit from an electrical source through a solenoid 168 when there is substantial magnetism in the coil of the relay 168 controls a valve 169 which is arranged to supply hydraulic pressure to a piston and cylinder unit 171 when solenoid 168 is energised and to connect piston and cylinder unit 171 to return when solenoid 168 is de-energised. Piston and cylinder unit 171 is spring-loaded by spring 172 to cause the piston 173 thereof to engage a stop 174. In this position bell crank lever 31 is so held that the pawl 29 disengages from the one end or the other of the slot 32 permitting lever 23 to move to its central position.

This embodiment is substituted in FIGURE 1 for the gear pumps 57, 58, the restrictors 64, 68 and the piston and cylinder unit 33, 34. When in operation with a gear engaged, the input and output shafts 5 and 7 of the gear box 6 will rotate in a gear ratio as determined by the position of the plate 18. The position of the plate 18 will also control the position of the switch 166 by means of the connecting link 175, whereby the switch 166 is also set in a position appropriate to the gear engaged. The tapping on winding 165 engaged by 166 will be such that at the selected gear ratio the currents flowing in the two windings 164 and 165 are in such proportion that their total magnetic effect is zero, the controlled relay contact 167 then being in the open position. On selecting a change of gear, gear lever 23 is moved to the appropriate "Up" or "Down" position which will disengage the clutch within the gear box 6 and prepare a hydraulic circuit for a new gear clutch to be engaged. As previously described with reference to FIGURE 1, the hydraulic motor shaft 5 will alter its speed to tend to assume a speed having a gear ratio relative to the gear box output shaft 7 in accordance with the new gear to be engaged. During the period that the shaft 5 is moving towards the required speed, the magnetic effect generated within the coils 164 and 165 will not be exactly equal and the armature of the relay 163 will be attracted to close contacts 167 so that current passes through the solenoid winding 168. The action of this current is to adjust valve 169 to connect pressure to the piston and cylinder unit 171 to cause pawl 29 to engage the end of slot 32 and thus to retain lever 23 in its displaced position. When the shaft 5 acquires this synchronised speed, the current passing through the coil 165 is such that its magnetic effect is equal and opposite to the magnetic effect produced by coil 164, thus permitting the relay contact 167 to open to adjust solenoid valve 169 to vent the piston and cylinder unit 171. The pawl 29 is thus released and the lever 23 will move to its central position simultaneously causing engagement of the clutch within the gear box to engage the new gear.

We claim:

1. In combination, a hydrostatic power transmission and a step change mechanical gear box arranged in series for the transmission of power from a power source to a load, a clutch associated with gear box and having driving and driven shafts through which the power passes from the transmission to the load, a speed ratio control for the transmission, a gear selecting control for the gear box, overrider means responsive to each change of gear by the gear selecting means, to disengage the clutch and override the speed ratio adjustment of the transmission speed ratio control, so as to cause an increase or decrease in the transmission speed ratio in accord with the decrease or increase, respectively, in the gear box speed ratio, and speed difference means responsive to the gear change to terminate the control of the overrider means and re-engage the clutch when the speeds of the driving and driven shafts of the clutch become equal.

2. The combination according to claim 1 further comprising a speed governor which is responsive to the speed ratio of the power source to adjust the transmission speed ratio in the sense of keeping the power source speed ratio constant.

3. The combination according to claim 1 further comprising compensating means operative to correct the action of the speed difference means for the speed ratio of the gear box.

4. The combination according to claim 3 wherein the speed difference means includes a pair of fixed displacement pumps driven by the driving and driven shafts of the clutch, and a restrictor for each pump through which the liquid delivery thereof passes; and wherein the compensating means includes means operative to vary at least one of the restrictors so that when the driving and driven shafts of the gear acquire a predetermined speed ratio in accord with the selected speed ratio of the gear box, the pressure drops at the restrictors acquire the predetermined relative values at which clutch engagement occurs.

5. Apparatus as claimed in claim 3 in which the speed difference means comprises a differential gear; and, wherein the compensating means comprises selectable gearing of inverse gear ratio to the gear ratios of the gear box.

6. Apparatus as claimed in claim 3, in which the speed difference means comprises centrifugal fly-weights; and, wherein the compensating means comprises an adjustable spring-loading for at least one of the centrifugal fly-weights.

References Cited by the Examiner

UNITED STATES PATENTS

| 1,686,827 | 10/1928 | Maag | 74—339 |
| 1,702,721 | 2/1929 | Charles | 74—339 |
| 2,833,160 | 5/1958 | Morgan | 74—339 |
| 3,103,826 | 9/1963 | Jaeschke | 74—339 |

FOREIGN PATENTS

| 41,264 | 12/1932 | France. |
| 1,069,762 | 7/1954 | France. |
| 854,031 | 11/1960 | Great Britain. |

DAVID J. WILLIAMOWSKY, *Primary Examiner.*

H. S. LAYTON, *Assistant Examiner.*